(12) United States Patent
Kim (10) Patent No.: US 8,606,663 B2
(45) Date of Patent: Dec. 10, 2013

(54) MANAGEMENT SERVER AND METHOD OF CHARGING FOR PRINTING

(75) Inventor: Su-dong Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 392 days.

(21) Appl. No.: 12/926,984

(22) Filed: Dec. 21, 2010

(65) Prior Publication Data

US 2011/0302062 A1 Dec. 8, 2011

(30) Foreign Application Priority Data

Jun. 3, 2010 (KR) .................. 10-2010-0552423

(51) Int. Cl.
*G07F 19/00* (2006.01)
*G07B 17/00* (2006.01)

(52) U.S. Cl.
USPC .......................................... 705/30

(58) Field of Classification Search
None
See application file for complete search history.

(56) References Cited

U.S. PATENT DOCUMENTS

| 2002/0134829 | A1* | 9/2002 | Tanaka ........................ 235/375 |
| 2009/0112738 | A1 | 4/2009 | Nagata |
| 2010/0309506 | A1* | 12/2010 | Reitz et al. ................ 358/1.15 |
| 2011/0191148 | A1* | 8/2011 | Carlson et al. ............. 705/14.1 |

FOREIGN PATENT DOCUMENTS

| JP | 2002-99836 | 4/2002 |
| JP | 2002-288318 | 10/2002 |

OTHER PUBLICATIONS

European Search Report issued Aug. 31, 2011 in corresponding European Patent Application No. 11168357.9.

\* cited by examiner

*Primary Examiner* — Paul Danneman
(74) *Attorney, Agent, or Firm* — Staas & Halsey LLP (57) ABSTRACT

A method of charging for printing including setting a basic charge in the image forming apparatuses, receiving information about a recording agent installed in the image forming apparatus at predetermined intervals, determining whether or not the recording agent of the image forming apparatuses is replaced, based on the received information about the recording agent, counting a number of times the recording agent of the image forming apparatuses is replaced in a charging period, based on the determination as to whether or not the recording agent is replaced, and calculating a printing cost for the image forming apparatuses, using the counted number of times the recording agent is replaced and the basic charge as set.

24 Claims, 8 Drawing Sheets

Billing Report

Export | Print

Billing Period — ▶ Period [2010 ▾] - [JAN ▾]  ○ Quarter  ● Month

Billing Type  ● By Device  ○ By Group

Generate

| Model Name | S/N | Toner Type | No. of times toner is replaced | Basic charge | Unit cost per toner | Printing cost | |
|---|---|---|---|---|---|---|---|
| ML-4550 | ABC-098712 | Black | 3 | $150 | $100 | $450 | $450 |
| CLX-8380N | EQW-110976 | Cyan | 1 | $200 | $150 | $350 | $1,900 |
| | | Magenta | 2 | $200 | $150 | $500 | |
| | | Yellow | 2 | $200 | $150 | $500 | |
| | | Black | 4 | $150 | $100 | $550 | |
| CLP-660 | SEC-871290 | Cyan | 2 | $250 | $200 | $650 | $2,200 |
| | | Magenta | 1 | $250 | $200 | $450 | |
| | | Yellow | 2 | $250 | $200 | $650 | |
| | | Black | 3 | $150 | $100 | $450 | |

MANAGEMENT SERVER AND METHOD OF CHARGING FOR PRINTING

CROSS-REFERENCE TO RELATED APPLICATIONS

This application claims priority from Korean Patent Application No. 10-2010-0052423, filed on Jun. 3, 2010, in the Korean Intellectual Property Office, the disclosure of which is incorporated herein by reference in its entirety.

BACKGROUND

1. Field

The present inventive concept relates to a management server and a method of charging for printing, and more particularly, to a management server and a method of charging for printing, calculating a printing cost based on a number of times that a recording agent, installed in an image forming apparatus, is replaced.

2. Description of the Related Art

An image forming apparatus operates to record print data, generated by a terminal such as a computer, onto a recording medium. The image forming apparatuses include photocopiers, printers, facsimiles or multi-function peripherals (MFP) combining the functions of the above apparatuses.

The business-to-business (B2B) market has rapidly grown recently, in which the suppliers of printer management solutions manage printers for universities, corporate enterprises, or the like. In the B2B market, the suppliers set a charge for printing based on the previously agreed rate for printing one sheet of printing medium or the like, and collect the total amount of printouts within a charging period to calculate the final cost.

One drawback of calculating the printing cost in the manner explained above is that the users are charged for printing irrespective of the amount of toner they use. That is, a user, who prints out one sheet of paper, could be overcharged if his printing uses the toner in an amount less than general reference, while another user, also printing out one sheet of paper, could be undercharged if his printing uses the toner in an amount exceeding the general reference.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one embodiment, a management server and a method of charging for printing are provided, in which a cost of printing using an image forming apparatus is calculated based on a number of times a cartridge, installed in the image forming apparatus, is replaced.

In one embodiment, a method of charging for printing at a management server connected to a plurality of image forming apparatus, may include setting a basic charge in the image forming apparatuses, receiving information about a recording agent installed in the image forming apparatus at predetermined intervals, determining whether or not the recording agent of the image forming apparatuses is replaced, based on the received information about the recording agent, counting a number of times the recording agent of the image forming apparatuses is replaced in a charging period, based on the determination as to whether or not the recording agent is replaced, and calculating a printing cost for the image forming apparatuses, using the counted number of times the recording agent is replaced and the basic charge as set.

The information about the recording agent may include at least one of a serial number of the recording agent, and an amount of the recording agent.

In one embodiment, the method of charging for printing at a management server connected to a plurality of image forming apparatus may additionally include storing the received information about the recording agent and the counted number of times the recording agent is replaced.

The determining may include comparing a serial number of the recording agent, from among the received information about the recording agent, with a previously-stored serial number of the recording agent to determine whether the recording agent is replaced or not.

The determining may include comparing an amount of the recording agent, from among the received information about the recording agent, with a previously-stored amount of the recording agent to determine whether the recording agent is replaced or not.

The counting may include comparing a serial number of the recording agent, from among the received information about the recording agent, with a previously-stored serial number of the recording agent, and counting the number of times the recording agent of the image forming apparatus is replaced, if the serial number of the recording agent is different from the previously-stored serial number.

The counting may include counting the number of times the recording agent of the image forming apparatus is replaced, if the amount of the recording agent after the determined point of recording agent replacement exceeds a first predetermined reference value, and if the amount of the recording agent before the point of recording agent replacement is below a second predetermined reference value.

The image forming apparatus may include a plurality of recording agents, and the receiving step may include receiving information about each of the plurality of recording agents installed in the image forming apparatus.

The calculating step may include calculating a printing cost for the image forming apparatus, by calculating a printing cost for each of the plurality of recording agents of the image forming apparatus, and adding up the calculated printing costs.

The method of charging for printing at a management server connected to a plurality of image forming apparatus may additionally include displaying the calculated printing cost.

The displaying step may include displaying at least one of: a first area to indicate the number of times that the recording agents installed in the image forming apparatuses are replaced; a second area to indicate a printing cost for each of the recording agents, and a third area to indicate a time point when each of the recording agents is replaced.

According to another embodiment, a management server connected to a plurality of image forming apparatuses, may include a communication interface unit to receive information about a recording agent installed in the image forming apparatuses at predetermined intervals, a determining unit to determine whether or not the recording agent of the image forming apparatuses is replaced, based on the received information about the recording agent, a counting unit to count a number of times the recording agent of the image forming apparatuses is replaced in a charging period, based on the determination as to whether or not the recording agent is replaced, and an accounting unit to calculate a printing cost for the image forming apparatuses, using the counted number of times the recording agent is replaced and a basic charge set in advance.

The information about the recording agent may include at least one of a serial number of the recording agent, and an amount of the recording agent.

The management server may additionally include a storage unit to store the received information about the recording agent and the counted number of times the recording agent is replaced.

The determining unit may compare a serial number of the recording agent, from among the received information about the recording agent, with a previously-stored serial number of the recording agent to determine whether the recording agent is replaced or not.

The determining unit may compare an amount of the recording agent, from among the received information about the recording agent, with a previously-stored amount of the recording agent to determine whether the recording agent is replaced or not.

The counting unit may compare a serial number of the recording agent, from among the received information about the recording agent, with a previously-stored serial number of the recording agent, and count the number of times the recording agent of the image forming apparatus is replaced, if the serial number of the recording agent is different from the previously-stored serial number.

The counting unit may count the number of times the recording agent of the image forming apparatus is replaced, if the amount of the recording agent after the determined point of recording agent replacement exceeds a first predetermined reference value, and if the amount of the recording agent before the point of recording agent replacement is below a second predetermined reference value.

The image forming apparatus may include a plurality of recording agents, and the communication interface unit may receive information about each of the plurality of recording agents installed in the image forming apparatus.

The accounting unit may calculate a printing cost for each of the plurality of recording agents of the image forming apparatus, by calculating a printing cost for each of the plurality of recording agents of the image forming apparatus, and adding up the calculated printing costs.

The management server may additionally include a user interface unit to display the calculated printing cost.

The user interface unit may display at least one of: a first area to indicate the number of times that the recording agents installed in the image forming apparatuses are replaced; a second area to indicate a cost of each of the recording agents, and a third area to indicate a time point when each of the recording agents is replaced.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Certain exemplary embodiments of the present inventive concept will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Figure 1:
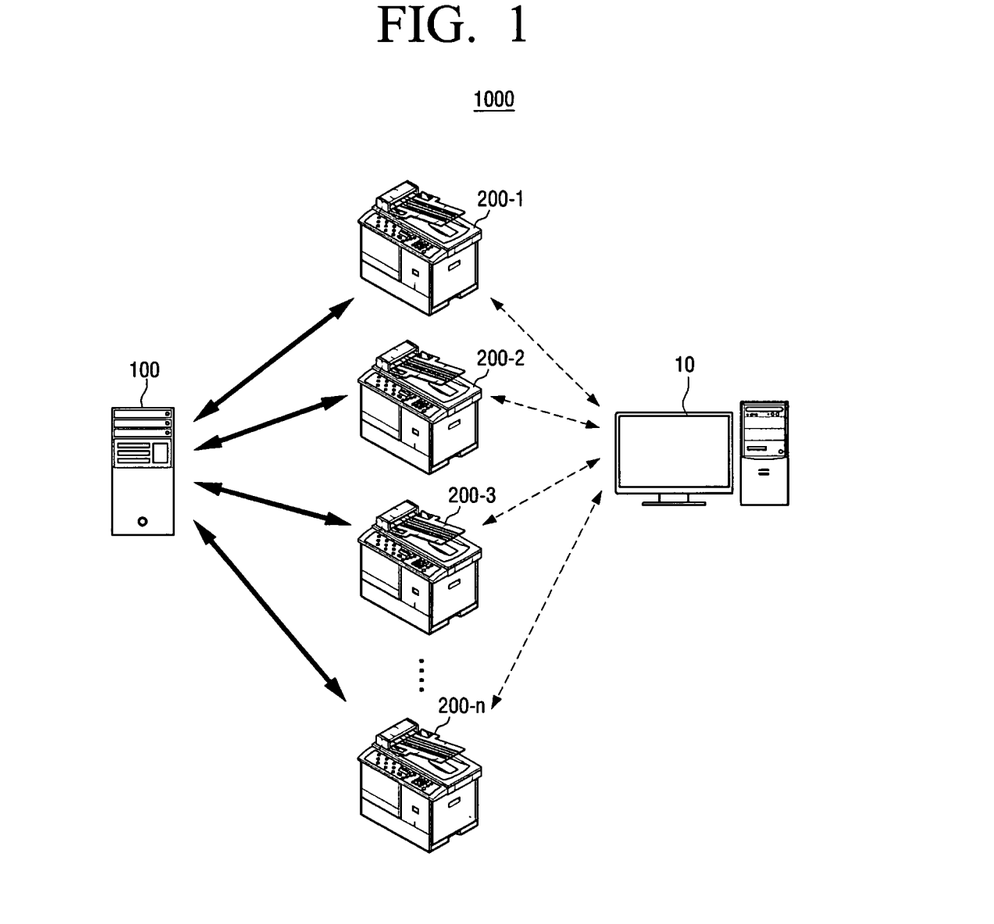
FIG. 1 is a block diagram of a system to charge for printing according to an embodiment.

FIG. 1 is a block diagram of a printing charging system 1000 according to an embodiment.

Referring to FIG. 1, the printing charging system 1000 may include a management server 100, and a plurality of image forming apparatuses 200-1, 200-2, 200-3, . . . , 200-n.

The management server 100 receives from each of the plurality of image forming apparatuses information about recording agent, and calculates a printing cost based on the received recording agent information. The structure and operation of the management server 100 will be explained in greater detail below with reference to FIG. 2.

The image forming apparatuses 200-1, 200-2, 200-3, . . . , 200-n may be connected to the management server 100, and transmit the recording agent information to the management server 100 upon request by the management server 100. The structure and functions of the image forming apparatuses will be explained in greater detail below with reference to FIG. 3.

Referring to FIG. 1, the four image forming apparatuses 200-1, 200-2, 200-3, . . . , 200-n are illustrated as being connected to the management server 100 for the illustrative purposes. However, more than four image forming apparatuses may be connected to the management server 100, either in direct connection, or in indirect connection through a router, another management server, or the like.

Figure 2:
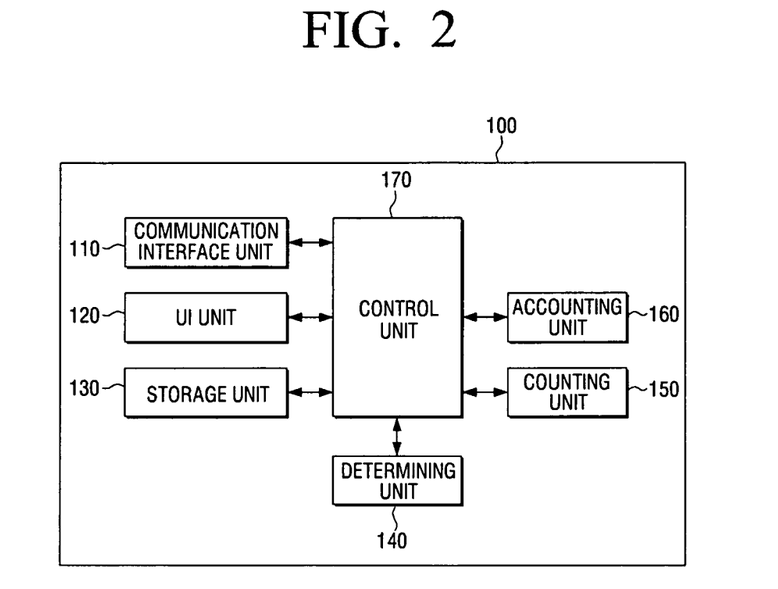
FIG. 2 is a block diagram of detailed structure of the management server of FIG. 1.

FIG. 2 is a block diagram illustrating the detailed structure of the management server 100.

Referring to FIG. 2, the management server 100 may include a communication interface unit 110, a user interface (UI) unit 120, a storage unit 130, a determining unit 140, a counting unit 150, an accounting unit 160, and a control unit 170.

The communication interface unit 110 may be connected to the plurality of image forming apparatuses 200-1, 200-2, 200-3, . . . , 200-n. Specifically, the communication interface unit 110 may be formed to connect the management server 100 to an external device. For example, the communication interface unit 110 may be connected to the image forming apparatuses 200-1, 200-2, 200-3, . . . , 200-n via the local area network (LAN) or the internet, or using a universal serial bus (USB) port.

The communication interface unit 110 may receive from each of the image forming apparatuses information about the recording agent. Specifically, the communication interface unit 110 may request and receive in return the information about the currently-installed recording agent of each of the image forming apparatuses 200-1, 200-2, 200-3, . . . , 200-n, or the image forming apparatuses 200-1, 200-2, 200-3, . . . , 200-n may transmit the information about the recording agent to the communication interface unit 110 automatically at predetermined intervals. The communication interface unit 110 may request the information about the recording agent using the simple network management protocol (SNMP), and request each of the image forming apparatuses for the information about the recording agent at predetermined intervals (e.g., one day).

The term 'recording agent' herein refers to a substance used to form an image, and may include toner or ink. The 'recording agent information' herein may thus include information about a toner cartridge (or developer) serial number, an amount of toner stored in the toner cartridge, a serial number of ink liquid cartridge, or an amount of ink stored in the ink cartridge. In one embodiment, only the recording agent information is received. However, in another embodiment, the recording agent information may be received along with the information regarding the image forming apparatus such as serial number or IP address.

Meanwhile, if the image forming apparatus supports color printing, the image forming apparatus may have recording agents in a plurality of colors including cyan, magenta, yellow and black. In this case, the communication interface unit 110 may receive information about the recording agents of the plurality of colors altogether.

The UI unit 120 may include a plurality of function keys with which a user may set or select the functions supported by the management server 100. The UI unit 120 may display various information provided by the management server 100. The UI unit 120 may be implemented as a device such as a touchpad which is capable of both inputting and outputting, or a device implemented in combination with a mouse or a monitor.

Additionally, the UI unit 120 may display a UI window through which a unit cost per printing may be inputted. Accordingly, a person who manages the image forming apparatuses may set unit costs per each type of the image forming apparatuses and also per each type of the recording agents installed in the respective image forming apparatuses through the UI window as displayed. The term 'unit cost per printing' herein may refer to a pay for a predetermined unit of printing agreed upon by the supplier of the printer management solution and the user of the image forming apparatus, and include, for example, a basic fixed cost which is charged for every print job either including or excluding a change of recording agent, and unit cost per recording agent. The basic fixed cost or the unit cost per recording agent may differ according to the image forming apparatuses. Additionally, if the image forming apparatus includes the recording agents of a plurality of colors, different basic fixed costs and unit costs may be set depending on the types of the recording agents installed in the image forming apparatus.

The UI unit 120 may additionally display a calculated printing cost. Specifically, the UI unit 120 may display the printing costs for toners, image forming apparatuses, or users, each being calculated at the accounting unit 160 explained in detail below. The UI unit 120 may also display the unit cost per printing which is previously set and stored at the storage unit 130. Additionally, the UI unit 120 may also display the number of times the recording agent is replaced, which is counted at the counting unit 150 explained below. The UI window will be explained in detail below by referring to certain examples and with reference to FIGS. 5 and 6.

Figure 4:
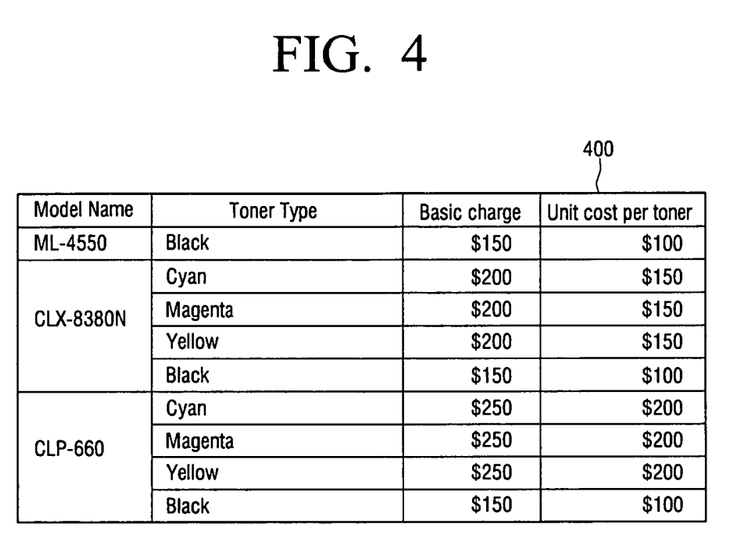
FIG. 4 is a view illustrating an example of a unit cost set in advance according to an embodiment.

The storage unit 130 may store information about a plurality of connected image forming apparatuses. Additionally, the storage unit 130 may store information about the unit cost set for the respective connected image forming apparatuses. In specific, the storage unit 130 may store the unit cost per each type of recording agent installed in the connected image forming apparatuses in the lookup table pattern as illustrated in FIG. 4.

The storage unit 130 may additionally store information about the recording agent. That is, the storage unit 130 may receive information about the recording agents installed in the image forming apparatus 200 and store the received information. The information about the recording agents may be received periodically, and the periodically-received information may be stored at the storage unit 130 in time order.

Additionally, the storage unit 130 may store therein the number of times the recording agent is replaced, counted at the counting unit 150 explained below, and the printing cost calculated at the accounting unit 160. Specifically, the storage unit 130 may store counting information regarding each of the recording agents installed in the plurality of connected image forming apparatuses, and the stored counting information may be updated according to the control by the counting unit 150. Meanwhile, the storage unit 130 may be implemented as a storage medium built in the management server 100, or as an external storage medium such as, for example, a removable disk including a USB, or a web server connected via network.

The determining unit 140 may determine whether or not the recording agent of the image forming apparatus is replaced, based on the received information about the recording agent. Specifically, from among the information about the recording agent received through the communication interface unit 110, the determining unit 140 may compare the serial number of the recording agent with the previously received and stored serial number of the recording agent, to determine if the toner has been replaced. For example, if the serial number of the recording agent 'CRUM-10148001' is previously received and stored at the storage unit 130, and if 'CRUM-10148001' is additionally received thereafter, the determining unit 140 may determine that the recording agent has not been replaced at the time of receiving the new recording agent information. However, if a new serial number, which is different from the previous serial number, is received, the determining unit 140 may determine that the recording agent has been replaced.

The determining unit 140 may also compare the amount of recording agent (i.e., amount of toner or ink) with the previously received and stored recording agent amount, to determine whether the toner has been replaced or not. Specifically, if the information regarding the recording agent, received through the communication interface unit 110, includes the amount of recording agent exceeding the amount of recording agent previously received and stored at the storage unit 130, the determining unit 140 may determine that the recording agent has been changed. For example, if the previously stored amount of recording agent at the storage unit 130 is '20%', and the newly received amount of recording agent is '90%', the determining unit 140 may determine that the recording agent has been changed. Meanwhile, in practical implementation, the determining unit 140 may determine the replacement of toner only when the amount of recording agent increases to above a predetermined amount (e.g., 40%).

The counting unit 150 may count the number of times the recording agent of the image forming apparatus is replaced within a charging period, based on the determination that the recording agent is replaced. Specifically, if the determining unit 140 determines that the recording agent is replaced based on the result of comparison that indicates that the newly received information about recording agent (e.g., recording agent serial number) is different from the previously received and stored information about the recording agent, the counting unit 150 may increment the counted number of times that the recording agent of the corresponding image forming apparatus is replaced.

Meanwhile, the counting unit 150 may count the number of times the toner of the image forming apparatus is replaced, only if the amount of recording agent after the point of replacement exceeds a first predetermined reference value and if the amount of toner before the determined point of toner replacement is below a second predetermined reference value. Specifically, if the recording agent is replaced when replacement is unnecessary (e.g., if remaining amount of recording agent is 50~100%), or if the amount of new recording agent is 0~50%, the counting unit 150 may not count such as the time that the recording agent is replaced, even though the recording agent is replaced.

The accounting unit 160 may calculate the printing cost of the image forming apparatus, using the counted number of times the toner is replaced and the unit cost set in advance. Specifically, the accounting unit 160 may multiply the number of time the recording agent (e.g., toner) of the image forming apparatus is replaced, by the unit cost per toner, and add the basic fixed cost to the product of the multiplication, to thus calculate the printing cost corresponding to the recording agent as used. If the image forming apparatus includes a plurality of recording agents, the accounting unit 160 may calculate the printing cost for each of the recording agents, and add up the calculated printing costs to thus calculate the printing cost for using the corresponding image forming apparatus. If the user is printing through a plurality of image forming apparatuses, the accounting unit 160 may calculate the printing cost for the user, by adding up the printing costs calculated for the respective image forming apparatuses.

The control unit 170 may control the respective components within the management server 100. Specifically, the control unit 150 may receive the unit costs set for the respective image forming apparatuses through the UI unit 120, and control the determining unit 140, the counting unit 150 and the accounting unit 160 to calculate the printing cost using the set unit costs and information about the recording agent. Additionally, if the control unit 170 receives a user command to display the calculated cost, the control unit 170 may control the UI unit 120 to display the printing cost calculated for the charging period.

As explained above, according to the embodiments, the management server 100 calculates the printing cost more fairly, by counting the number of times the recording agent is replaced based on the received information about the recording agent and accordingly calculating the printing cost.

Figure 3:
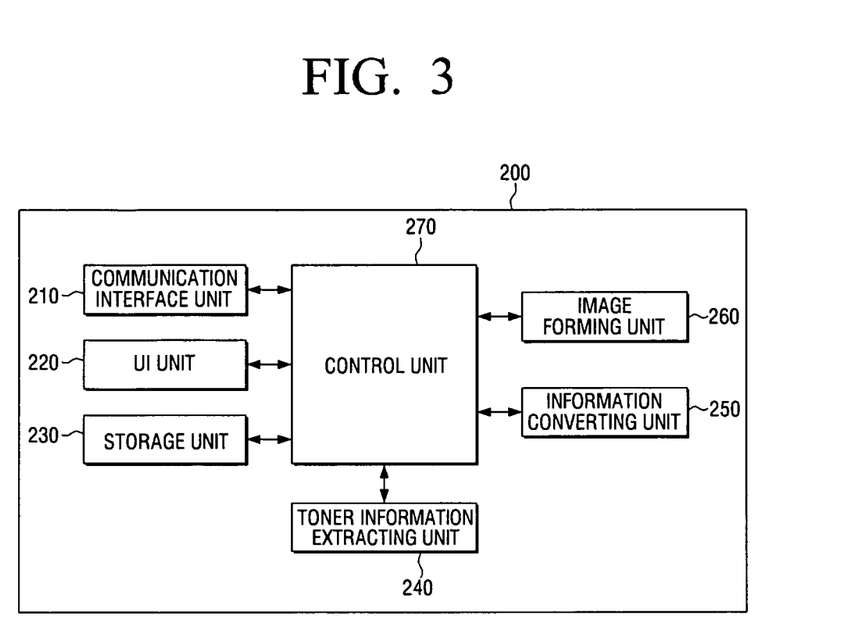
FIG. 3 is a block diagram of detailed structure of the image forming apparatus of FIG. 1.

FIG. 3 is a block diagram of the image forming apparatus 200 of FIG. 1.

Referring to FIG. 3, the image forming apparatus 200 may include a communication interface unit 210, a UI unit 220, a storage unit 230, a toner information extracting unit 240, an information converting unit 250, an image forming unit 260, and a control unit 270.

The communication interface unit 210 is formed to connect the image forming apparatus 200 to the management server 100, via the local area network (LAN), the internet, or the universal serial bus (USB) port. The communication interface unit 210 may receive a request from the management server 100 for information about recording agent, and respond with the recording agent information to the request. In actual implementation, the communication interface unit 210 may transmit the recording agent information to the management server 100 periodically, i.e., transmit the information in absence of a separate request.

The communication interface unit 210 may be connected to a print control terminal 10, and receive from the print control terminal 10 a command to execute a job. Specifically, the communication interface unit 210 may receive from the print control terminal 10 a command to execute a print job. The communication interface unit 210 may transmit the result of the requested print job to the print control terminal 10.

The UI unit 220 may include a plurality of function keys with which a user may set or select the functions supported by the image forming apparatus 200, and also display the information provided by the image forming apparatus 200. The UI unit 220 may be implemented as a touchpad capable of inputting and outputting, or as a device combined with an input device such as mouse or keyboard, and a display device such as CRT monitor, LCD monitor, or LED.

The storage unit 230 may store information about the image forming apparatus. Specifically, the storage unit 230 may store a model name, an IP address, or a serial number of the image forming apparatus, or a toner serial number extracted from the toner information extracting unit 240, or the amount of toner. Meanwhile, the storage unit 230 may be implemented as a built-in storage medium of the image forming apparatus 200, or as an external storage medium such as a removable disk including a USB memory, a storage medium connected to the host, or a web server connected through a network.

The toner information extracting unit 240 may extract the information related to the toner. Specifically, the toner information extracting unit 240 may extract the toner serial number from the CRUM on the toner and extract stored information about the toner amount from the storage unit 230. Although the toner is exemplified as the recording agent to explain an embodiment, it should be understood that the inventive concept of the embodiment is applicable to the image forming apparatus using other type of recording agent such as an ink for example.

The information converting unit 250 may convert the format of the extracted toner information. Specifically, the information converting unit 250 may convert the extracted toner information into management information base (MIB) data, and map the converted MIB data to an object identifier (OID) value. The mapped MIB data may be transmitted to the management server 100 via the communication interface unit 210.

The image forming unit 260 is in charge of printing function. Specifically, the image forming unit 260 may perform printing of the print data which is received from the print control terminal 10.

The control unit 270 may control the respective components of the image forming apparatus 200. Specifically, the control unit 270, when receiving a print job from the print control terminal 10, controls the image forming unit 260 to execute the received print job. Additionally, if receiving a request for information about the recording agent form the management server 100, the control unit 270 may control the toner information extracting unit 240, the information converting unit 250, and the image forming unit 260 so that the information about the recording agent is transmitted to the management server 100 as a response.

FIG. 4 illustrates an example of unit cost which is set in advance according to an embodiment.

Referring to FIG. 4, the basic fixed cost and the unit cost per toner may be set for each image forming apparatus. Meanwhile, if the image forming apparatus contains a plurality of recording agents, the basic fixed cost and the unit cost per toner may be set for each of the recording agent.

Figure 5:
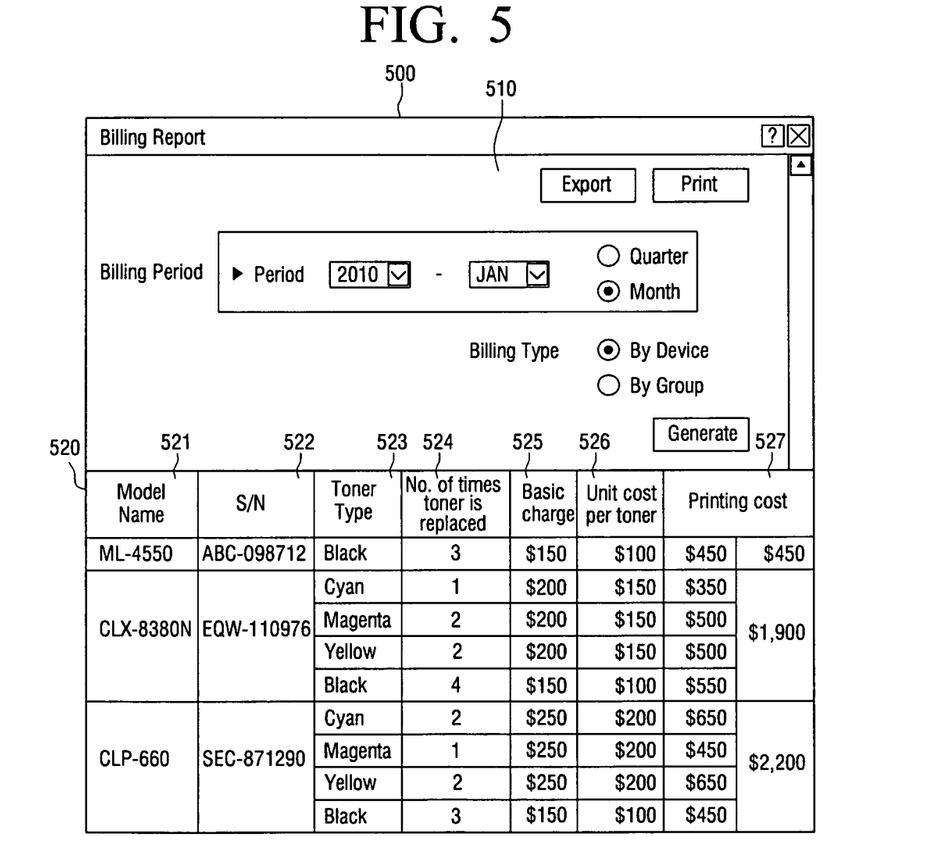
FIGS. 5 and 6 are views illustrating an example of a user interface (UI) displayed on the user interface unit of FIG. 2.
Figure 6:
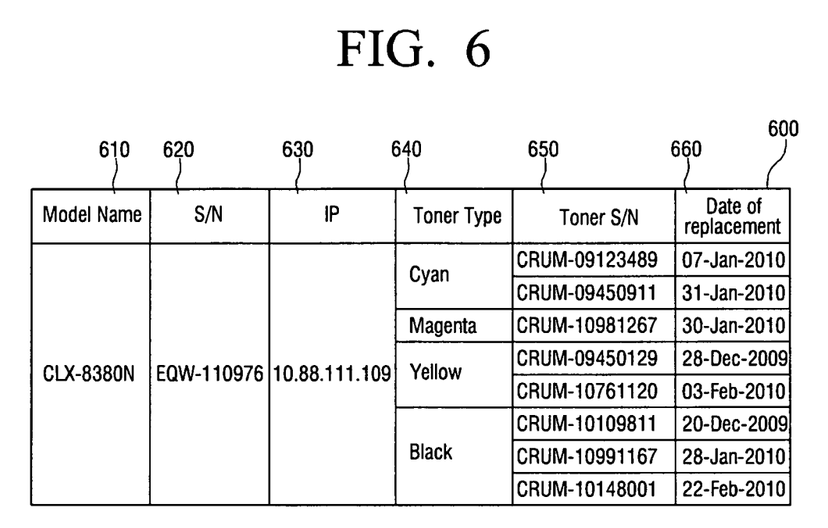

FIGS. 5 and 6 illustrate an example of the UI window displayed on the UI unit of FIG. 2.

Referring to FIG. 5, the UI window 500 may include a first area 510 to set a range of cost, and a second area 520 to display information about the respective image forming apparatuses and the cost information.

Specifically, the charging period may be set through the first area 510, wherein the user may set intervals of charging, or unit of charging through the first area 510.

The second area 520 displays information about the image forming apparatus for which printing is charged, and the charged printing cost. For example, the second area 520 may display information including, a model name 521 and a serial number 522 of the corresponding image forming apparatus, a recording agent type 523, a number of times the recording agent is replaced 524 during a set charging period, a basic charge 525 for a corresponding recording agent, a unit cost 526 for a corresponding recording agent, and a printing cost 527 calculated for the corresponding recording agent.

Referring to FIG. 6, the UI window 600 may display detailed information about replacement of recording agent. Specifically, the UI window 600 may include information 610, 620, 630 about an image forming apparatus selected by the user, information 640, 650 about the replaced recording agent, and information 660 about a specific time point when the recording agent is replaced in the image forming apparatus.

The user may check the detailed items of the printing cost, through the UI window as illustrated in FIGS. 5 and 6.

Figure 7:
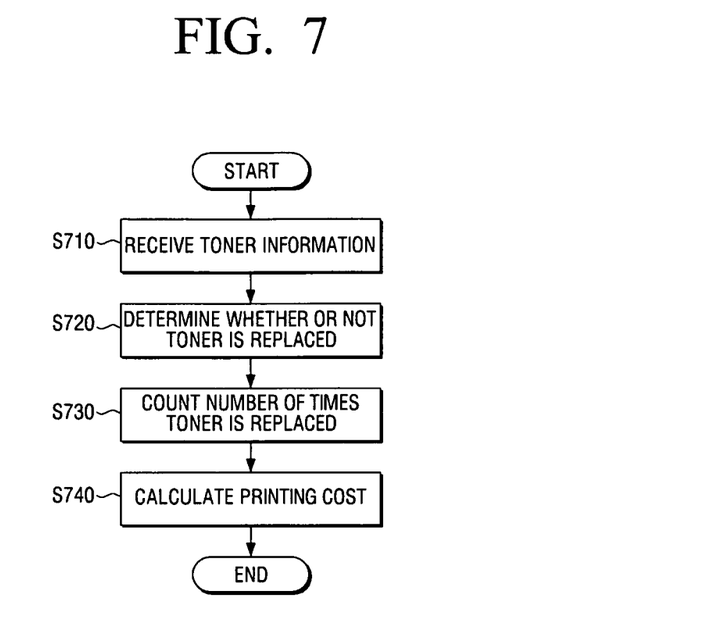
FIG. 7 is a flowchart provided to explain a method of charging for printing according to an embodiment.

FIG. 7 is a flowchart provided to explain a method of charging for printing according to an embodiment.

At S710, information about a recording agent installed in an image forming apparatus is received at predetermined intervals. Specifically, the information about the recording agent installed in the respective image forming apparatuses 200-1, 200-2, 200-3, . . . , 200-n may be requested to be transmitted periodically and thus received periodically.

At S720, whether or not the recording agent of the image forming apparatus is replaced, is determined based on the received information about the recording agent. Specifically, from among the received information about the recording agent, the serial number of the recording agent may be compared with the previously received and stored serial number of the recording agent, to determine the replacement of the toner. Alternatively, from among the received information about the recording agent, the amount of the recording agent may be compared with the previously received and stored amount of the recording agent, to determine the replacement of the toner. For example, the determining unit 140 may determine that the recording agent has been changed, if the amount of recording agent previously received and stored at the storage unit 130 is '20%', while the amount of recording agent received thereafter is '90%'.

At S730, the number of times the toner of the image forming apparatus is replaced within the charging period, is counted, based on the determination as to whether the toner is replaced or not. Specifically, if the recording agent is determined to have been replaced, the counted number of times the recording agent is replaced in the corresponding image forming apparatus may be incremented by one. Meanwhile, the number of times the toner is replaced may be counted, only if the amount of recording agent after the point of replacing the recording agent exceeds a first predetermined value (e.g., 100%~50%), and if the amount of toner before the determined point of toner replacement is below a second predetermined reference value (e.g., 0%~50%).

At S740, a printing cost for the image forming apparatus is calculated, using the counted number of times the toner is replaced and the previously-set basic charge. Specifically, the printing cost for a corresponding recording agent may be calculated by multiplying the number of times the recording agent (e.g., toner) is replaced, by the corresponding unit cost set for the recording agent, and adding the basic fixed cost to the product of the multiplication. If the image forming apparatus contains a plurality of recording agent types, the printing cost for the corresponding image forming apparatus may be calculated by calculating printing cost for each of the recording agent, and adding up the calculated printing costs. If the user is printing through a plurality of image forming apparatuses, the printing cost for the user may be calculated by adding up the printing costs for each of the image forming apparatuses.

Figure 8:
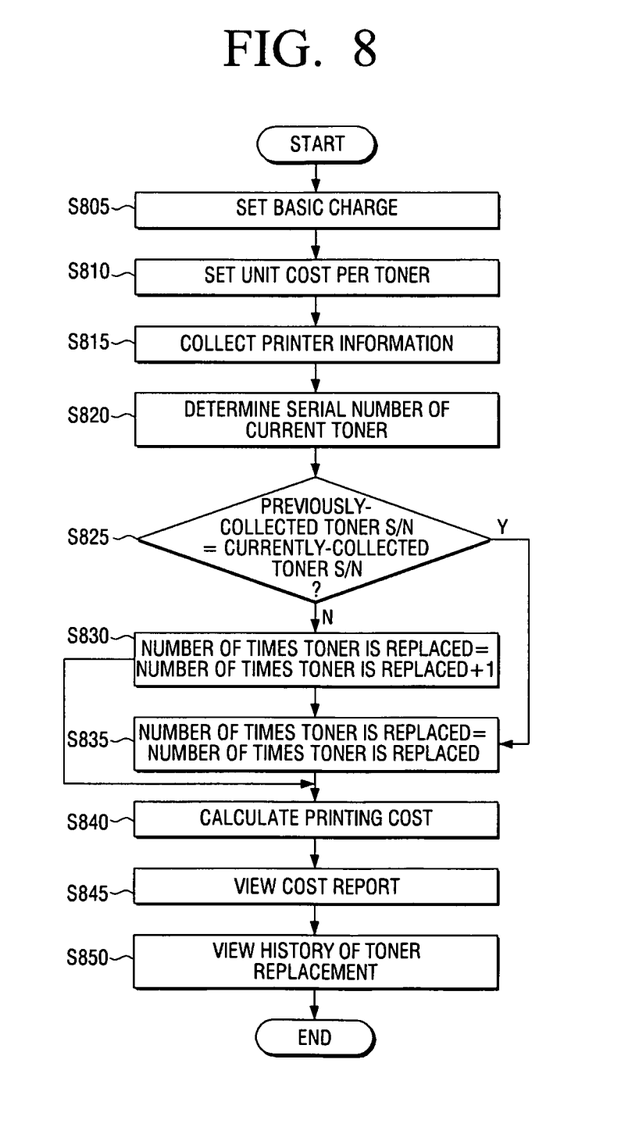
FIG. 8 is a flowchart provided to explain a method of charging for printing implementable when a toner serial number is utilized as printing information.

FIG. 8 is a flowchart provided to explain in detail a method of charging for printing, using serial information of the toner as the print information.

At S805 and S810, the basic fixed cost and the unit cost per each type of toner is set. Specifically, the basic fixed cost and the unit cost may be set for the image forming apparatuses and the toner types installed in the image forming apparatuses, in the lookup table pattern as illustrated in FIG. 4. Meanwhile, if the basic fixed cost and the unit cost per toner are previously set and stored, operations at S805 and S810 may be omitted.

At S815, information about the toner (i.e., recording agent information) is received from the image forming apparatus including, at S820, determining the serial number of the toner, and at S825, it is determined if the toner serial number, from among the received toner information, matches the previously-received serial number.

If the previously-stored serial number is different from the newly-received serial number, i.e., if it is determined that the serial number is changed, at S830, the previously-stored count information about the number of times the toner is replaced, is incremented by one. At S835, if the previously-stored and the newly-received serial numbers match, the number of times the toner is replaced does not change.

Meanwhile, the operations at S815 to S835 may be performed at predetermined intervals (e.g., one day) in a charging period (e.g., one month or week), and at S840, the printing cost for the corresponding image forming apparatus is calculated using the counted number of times the toner is replaced in the charging period.

Meanwhile, at S845 and S850, the calculated printing cost may be displayed for notice of the user. Specifically, if the user requests to view the calculated printing cost, at S845, the printing costs for the image forming apparatuses and the toners of the image forming apparatuses may be displayed as a cost report, and at S850, the detailed history of toner replacement may also be displayed.

According to the embodiments, the printing costs can be calculated more fairly, since the printing costs are calculated based on the number of times the recording agent of the image forming apparatus is replaced.

The method of charging for printing of FIGS. 7 and 8 is implementable on not only the management server constructed in the manner illustrated in FIG. 2, but also the management servers of different structures.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method of charging for printing at a management server connected to a plurality of image forming apparatus, the method comprising:
   setting a basic charge in the image forming apparatuses;
   receiving information at the management server about a recording agent installed in the image forming apparatus at predetermined intervals;
   determining whether or not the recording agent of the image forming apparatuses is replaced, based on the received information about the recording agent;
   counting a number of times the recording agent of the image forming apparatuses is replaced in a charging period, based on the determination as to whether or not the recording agent is replaced; and
   calculating a printing cost for the image forming apparatuses, using the counted number of times the recording agent is replaced and the basic charge as set.

2. The method of claim 1, wherein the information about the recording agent comprises at least one of a serial number of the recording agent, and an amount of the recording agent.

3. The method of claim 1, further comprising storing the received information about the recording agent and the counted number of times the recording agent is replaced.

4. The method of claim 1, wherein the determining comprises comparing a serial number of the recording agent, from among the received information about the recording agent, with a previously-stored serial number of the recording agent to determine whether the recording agent is replaced or not.

5. The method of claim 1, wherein the determining comprises comparing an amount of the recording agent, from among the received information about the recording agent, with a previously-stored amount of the recording agent to determine whether the recording agent is replaced or not.

6. The method of claim 5, wherein the counting comprises counting the number of times the recording agent of the image forming apparatus is replaced, if the amount of the recording agent after the determined point of recording agent replacement exceeds a first predetermined reference value, and if the amount of the recording agent before the point of recording agent replacement is below a second predetermined reference value.

7. The method of claim 1, wherein the counting comprises comparing a serial number of the recording agent, from among the received information about the recording agent, with a previously-stored serial number of the recording agent, and counting the number of times the recording agent of the image forming apparatus is replaced, if the serial number of the recording agent is different from the previously-stored serial number.

8. The method of claim 1, wherein the image forming apparatus comprises a plurality of recording agents, and the receiving comprises receiving information about each of the plurality of recording agents installed in the image forming apparatus.

9. The method of claim 8, wherein the calculating comprises calculating a printing cost for the image forming apparatus, by calculating a printing cost for each of the plurality of recording agents of the image forming apparatus, and adding up the calculated printing costs.

10. The method of claim 1, further comprising displaying the calculated printing cost.

11. The method of claim 10, wherein the displaying comprises displaying at least one of: a first area to indicate the number of times that the recording agents installed in the image forming apparatuses are replaced; a second area to indicate a printing cost for each of the recording agents, and a third area to indicate a time point when each of the recording agents is replaced.

12. A management server connected to a plurality of image forming apparatuses, the management server comprising:
   a communication interface unit to receive information at the management server about a recording agent installed in the image forming apparatuses at predetermined intervals;
   a determining unit to determine whether or not the recording agent of the image forming apparatuses is replaced, based on the received information about the recording agent;
   a counting unit to count a number of times the recording agent of the image forming apparatuses is replaced in a charging period, based on the determination as to whether or not the recording agent is replaced; and
   an accounting unit to calculate a printing cost for the image forming apparatuses, using the counted number of times the recording agent is replaced and a basic charge set in advance.

13. The management server of claim 12, wherein the information about the recording agent comprises at least one of a serial number of the recording agent, and an amount of the recording agent.

14. The management server of claim 12, further comprising a storage unit to store the received information about the recording agent and the counted number of times the recording agent is replaced.

15. The management server of claim 12, wherein the determining unit compares a serial number of the recording agent, from among the received information about the recording agent, with a previously-stored serial number of the recording agent to determine whether the recording agent is replaced or not.

16. The management server of claim 12, wherein the determining unit compares an amount of the recording agent, from among the received information about the recording agent, with a previously-stored amount of the recording agent to determine whether the recording agent is replaced or not.

17. The management server of claim 16, wherein the counting unit counts the number of times the recording agent of the image forming apparatus is replaced, if the amount of the recording agent after the determined point of recording agent replacement exceeds a first predetermined reference value, and if the amount of the recording agent before the point of recording agent replacement is below a second predetermined reference value.

18. The management server of claim 12, wherein the counting unit compares a serial number of the recording agent, from among the received information about the recording agent, with a previously-stored serial number of the recording agent, and counts the number of times the recording agent of the image forming apparatus is replaced, if the serial number of the recording agent is different from the previously-stored serial number.

19. The management server of claim 12, wherein the image forming apparatus comprises a plurality of recording agents, and the communication interface unit receives information about each of the plurality of recording agents installed in the image forming apparatus.

20. The management server of claim 19, wherein the accounting unit calculates a printing cost for each of the plurality of recording agents of the image forming apparatus, by calculating a printing cost for each of the plurality of recording agents of the image forming apparatus, and adding up the calculated printing costs.

21. The management server of claim 12, further comprising a user interface unit to display the calculated printing cost.

22. The management server of claim 21, wherein the user interface unit displays at least one of: a first area to indicate the number of times that the recording agents installed in the image forming apparatuses are replaced, a second area to indicate a cost of each of the recording agents, and a third area to indicate a time point when each of the recording agents is replaced.

23. The management server of claim 12, wherein the information about the recording agent comprises an amount of toner stored in a toner cartridge or an amount of ink stored in an ink cartridge.

24. The management server of claim 12, wherein the recording agent comprises recording agents in a plurality of colors including cyan, magenta, yellow and black, and
the communication interface unit receives information about the recording agents of the plurality of colors altogether.

\* \* \* \* \*

UNITED STATES PATENT AND TRADEMARK OFFICE
CERTIFICATE OF CORRECTION

| | |
|---|---|
| PATENT NO. | : 8,606,663 B2 |
| APPLICATION NO. | : 12/926984 |
| DATED | : December 10, 2013 |
| INVENTOR(S) | : Su-dong Kim |

It is certified that error appears in the above-identified patent and that said Letters Patent is hereby corrected as shown below:

On the Title Page, In Column 1 (Foreign Application Priority Data), Line 1, Delete "10-2010-0552423" and insert -- 10-2010-0052423 --, therefor.

Signed and Sealed this
Twenty-fifth Day of March, 2014

Michelle K. Lee
*Deputy Director of the United States Patent and Trademark Office*